United States Patent [19]
Larson

[11] 3,873,821

[45] Mar. 25, 1975

[54] GROMMET SECURED AND REVERSIBLE LIGHT REFLECTING DEVICE

[76] Inventor: Raymond George Larson, 9731 Rainier Cir., Huntington Beach, Calif. 92646

[22] Filed: Nov. 9, 1973

[21] Appl. No.: 414,362

[52] U.S. Cl. .................... 240/1 R, 135/34, 240/1.3, 240/103 R
[51] Int. Cl. ...................................................... F21
[58] Field of Search ......... 240/1 R, 1.3, 2 C, 103 R; 135/16, 34

[56] References Cited
UNITED STATES PATENTS

| | | | |
|---|---|---|---|
| 923,542 | 6/1909 | Losey | 240/13 |
| 2,105,225 | 1/1938 | Pollock | 135/34 |
| 3,429,320 | 2/1969 | Edelkind | 135/34 |
| 3,781,535 | 12/1973 | Larson | 240/1.3 |

Primary Examiner—Richard L. Moses
Attorney, Agent, or Firm—Mahoney, Schick & Cisio

[57] ABSTRACT

A uniquely configured and constructed light reflecting device which is easily handled and positionable into the erect or collapsible positions for ease of transport. The light reflector utilizes a fabric segment which has light reflecting surfaces of different characteristics on opposite edges thereof wherein the construction of the device permits reversiblity of the fabric and light surface for selected photographic lighting characteristics. The erectible, from the collapsible state, support structure employs specific structure which permits compactness of the device when in the collapsed state all of which lend desirable attributes of devices of the type disclosed herein utilized for photographic purposes.

8 Claims, 6 Drawing Figures

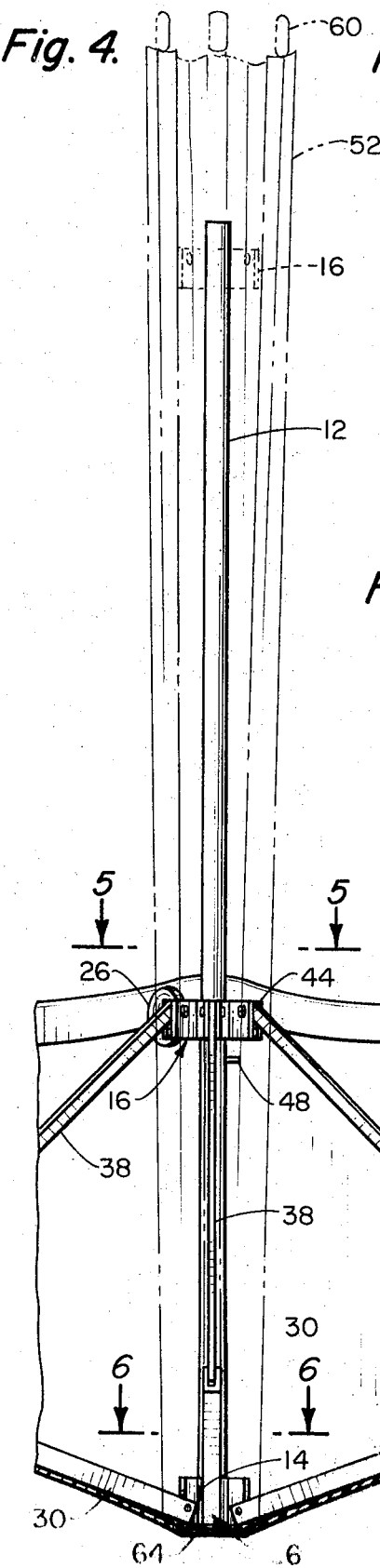
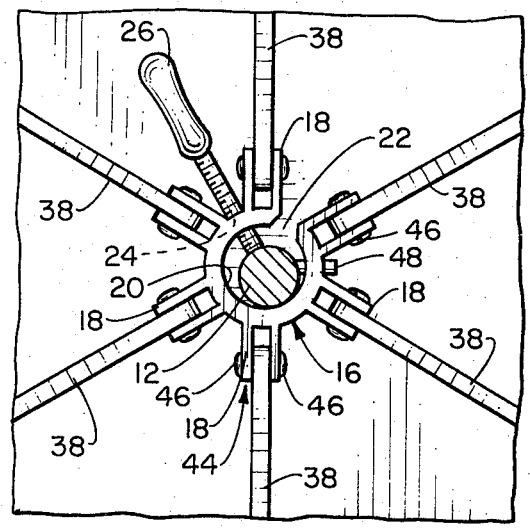
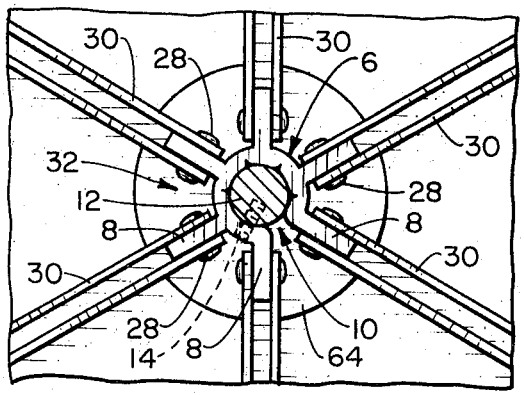

GROMMET SECURED AND REVERSIBLE LIGHT REFLECTING DEVICE

BACKGROUND OF THE INVENTION

Heretofore, various light reflecting devices have been suggested in the art of photography. Most of the devices have either comprised metallic, non-collapsible or foldable devices, screens or very sophisticated and thusly expensive devices, which were cumbersome to erect and difficult to transport.

Most of the prior art devices wherein reflection of light in photography was needed had one specific type of characteristic which did not permit utilization of the reflecting device for more than its intended lighting affect. Because of this limitation, light reflecting devices of the type used in photography were less than desirable in that they did not meet the myriad of needs wanting in the photography field.

With the hereindisclosed invention, a photographic light reflector device is disclosed which is normally in the collapsed state but is easily erectible into the erect state wherein the support structure has a specific type of configuration for compactness of the device when in the collapsed state and which utilizes a reflecting surface that has at least two surfaces to choose from and which, when either surface is positioned on the support structure, lends a specific selected lighting affect for photographic purposes.

The devices of the invention are relatively unsophisticated in the mechanical sense thereby insuring longevity of useage and are easy to operate and employ a reflecting surface that is removable and positionable to utilize one of the two reflective surfaces for particular effects.

OBJECTS AND SUMMARY OF THE INVENTION

It is an object of the invention to provide a photographic light reflector device which is easily asportable.

It is another object of the invention to provide a photographic light reflector device wherein one of two light reflecting surfaces may be chosen for use.

It is another still further important object of the invention to provide a photographic light reflector device wherein a support structure, on which a reversible light reflecting surface is supported, is collapsible into a compact unit.

It is still another more important specific object of the invention to provide a reflective device utilizing a fabric element having different light reflective properties on opposed surfaces thereof.

It is still another and more important, even further specific object of the invention to provide a photographic light reflector device wherein a light reflective element thereof has opposed surfaces of different light reflecting characteristics wherein the element is removable from the support structure and is retained thereon by means of the coaction of a support arm and grommet.

Basically, in an exemplary embodiment, the invention is directed to a photographic light reflector device comprising the combination of a selectively collapsible and erectible support structure including a first central hub member having a first plurality of radially spaced projections. An elongate rod member is secured to the center of the first central hub and a second central hub member having a second plurality of radially spaced projections, equal in number to and aligned with the first plurality of radially spaced projections, is slidably disposed and positioned on the elongate rod member. A plurality of ray members of open channel configuration extend from and are pivotally secured to each of the first plurality of radially spaced projections. The opposite free ends of the plurality of ray members have notched configurations. A plurality of support members, each having one end pivotally secured to each of said radially spaced projections of said second plurality with the opposed ends being pivotally secured to each of the ray members of said plurality intermediate the ends thereof, is also provided. The support members are of a size and shape so as to be received within the open channels of the respective ray members to which each is pivotally secured. A light reflective element comprising a member of polygonal configuration having spaced apertures along a peripheral edge thereof, corresponding in number to the number of rays of said plurality, is also provided. The light reflective member or element is of a sufficient size to be releasably retained by cooperation of the notched ends of said rays being received by a respective, spaced, aperture wherein the light reflective member or element is retained in taut, secured relationship with respect to the support structure, when the support structure is in the erected state.

These and other objects of the invention will become apparent as the description proceeds herein when taken in conjunction with the following commentary.

BRIEF DESCRIPTION OF THE DRAWINGS

FIG. 4 is a fragmented view illustrating the device of the invention in the erected state with the phantom lines showing same in the collapsed state;

FIG. 5 is a view taken along the line 5—5 of FIG. 4 showing details of construction of the device shown in FIG. 4; and FIG. 6 is a view taken along the line 6—6 of FIG. 4, illustrating additional detail of the support structure of the devices of this invention.

DESCRIPTION OF THE BEST EMBODIMENTS COMTEMPLATED

Figure 1:
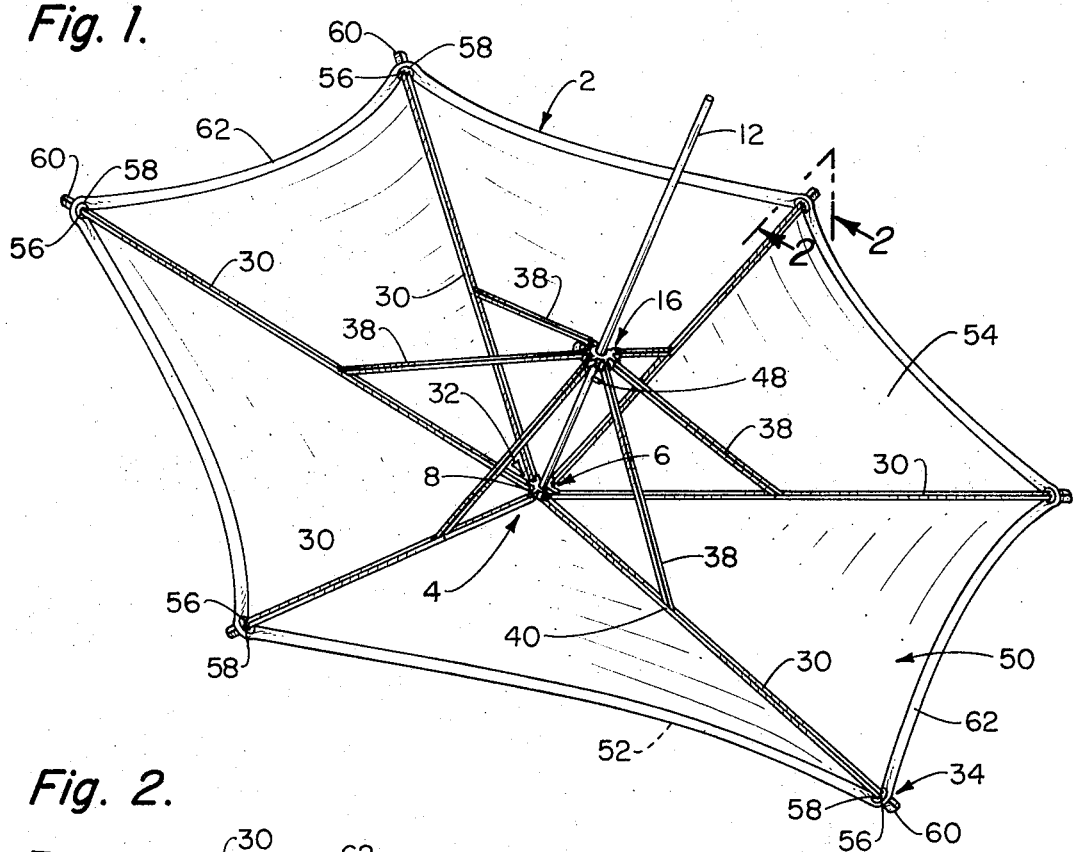
FIG. 1 is a perspective view of the device of the invention in the erected state, but not necessarily showing positioning of the device as it would be used in the photographic field, but positioned for purposes of clarity of the structure making up the device.
Figure 2:
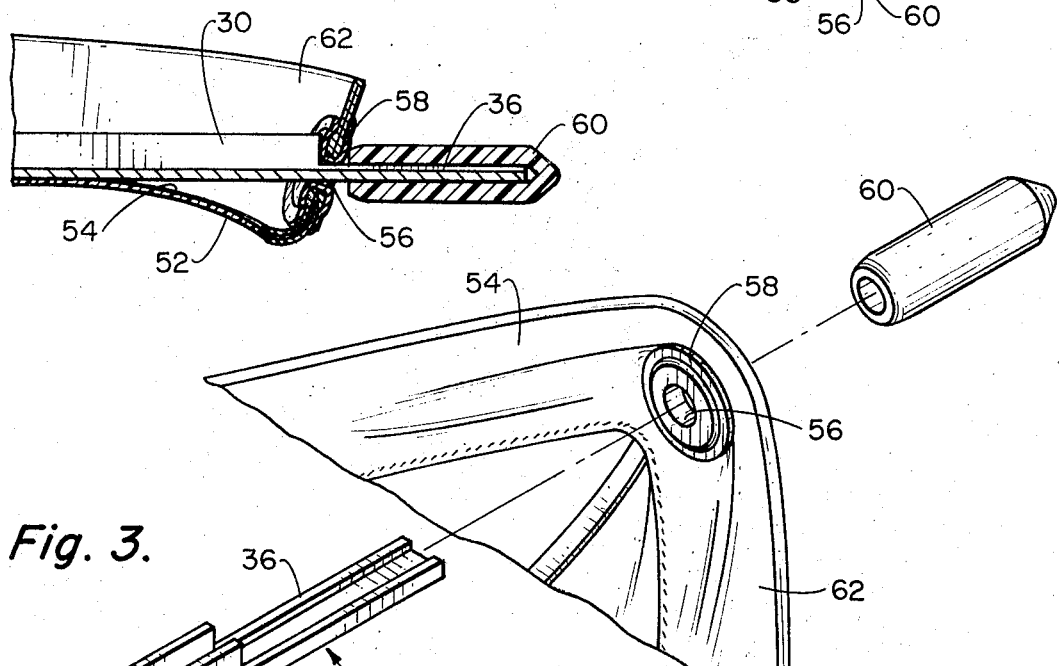
FIG. 2 is a view taken along the line 2—2 of FIG. 1.
Figure 3:
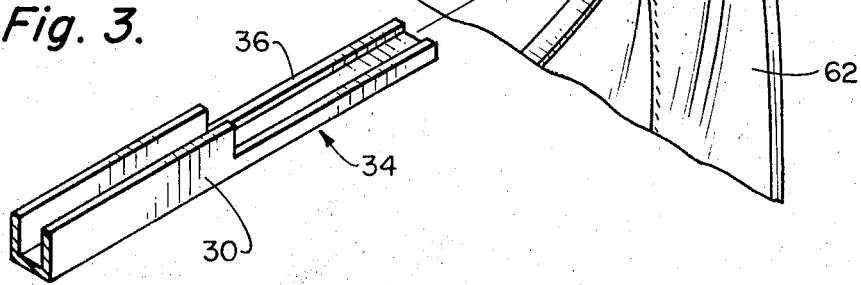
FIG. 3 is an enlarged view showing the mode of securement of the light reflective member or fabric of this invention to a ray or support arm of the support structure in cooperation with a grommet.

Referring specifically to the figures of drawing wherein like numerals of reference will designate like elements throughout, it will be seen that the light reflecting device of this invention 2 comprises a support structure generally designated 4 and having a first central hub member 6 having a plurality of radially spaced projections 8 and being integrally constructed in this case of metal, and having an open wall as at 10.

An elongate rod 12 is secured within the central aperture of the first hub member 6 by means of rivet 14 in a mode which is conventional in the metal fabricating art. The elongate rod 12 is sufficiently long to allow the light reflector device 2 to be mounted on tripod support structure or the like, not shown, but commonplace in the photography field. The elongate rod 12 is sufficiently long also to retain the second central hub member in slidable relationship therewith, as will be presently described and as will be apparent as the description proceeds herein.

A second central hub member 16 having spaced projections 18 of generally U-shaped configuration, in cross-section, and forming an open collar-like configuration with a central annulus 20 and having an open wall as at 22, is disposed in spaced relationship from the first central hub 6 on the rod 12 as best seen in FIG. 1.

The annulus 20 is of sufficient diameter so as to permit sliding disposition of the second hub 16 with relation to the elongate rod 12. A through bore 24 is provided in the collar portion of second hub 16 and receives a threaded thumbscrew 26, the inward positioning of which, bears against the juxtapositioned surface of elongate rod 12 in order to retain the second hub member 16 in rigid, stationary relationship with respect to the rod as well as its attached support structure as will become apparent.

To the arms 8 are pivotally secured by means of rivets 28, a plurality of ray members 30 of U-shaped open channel construction and having the first end 32 secured to the first hub 6 as just described with the opposite terminus 34 having a notched end 36 thereby forming a smaller dimensioned terminus than the remainder of the rays 30 for purposes which will later be described. Spaced inwardly from the ends 32 and 34 of rays 30, a plurality of support members 38 are secured by means of rivets 40 so that the support members 38 are pivotally mounted to each of the rays 30. As indicated, the end 42 of support members 38 are pivotally secured to the rays 30 while the opposite end 44 is pivotally secured within the U-shaped projections 18 of second hub member 16 by means of rivets 46 thereby providing the pivoted attachment.

It should be obvious that when the structure is in the erected state as illustrated in FIG. 1 and the thumbscrew 26 so positioned so as to retain the support structure 4 in its erected state, a stable support structure for the light reflecting member, as will be discussed, is provided. To prevent positioning of the second hub with regard to the elongate rod 12, so as to damage neither the support structure 4 or the light reflecting member, a pin stop 48 is provided which merely acts as an abutment stop, beyond which the second hub 16 cannot move.

Upon collapse of the support structure by simple backward movement of thumbscrew 26, the second hub 16 is allowed to move to the phantom line position shown in FIG. 4 to thereby collapse the support structure and thereby allowing the support members 38 to be received for the most part, in the open channels of members 30 when the support structure is in the collapsed state, as illustrated in the phantom line showing of FIG. 4.

A light reflective element 50, in this instance, comprises a polygonal shaped fabric, having one light reflective surface 52 and an opposite light reflective surface 54 of different characteristics for purposes that will be described. Along the perimeter or peripheral edge of member 50, there is provided spaced apertures 56 in this instance, being provided with metallic reinforcement rings 58 for purposes of strength. The apertures 56 are so positioned and placed so as to correspond alignment with the rays 30.

Upon selection of the light reflective surface (either 52 or 54) and while the support structure 4 is in the collapsed state, the apertures 56 are positioned on the notched end 36 of the rays 30 and held securely in position by the placement of the grommet 60 on the end 36 of ray 30 in secure fashion. The notched configuration adequately retains the member 50 in retained relationship to the support structure 4. A reinforcement band 62 may be provided along the peripheral edge of the member 50 also for reinforcement purposes.

So as not to harm or cut into the central portion of light reflector member 50, a circular piece of felt or other soft fabric 64 is positioned and secured adjacent the first hub 6 so as to maintain sharp edges of the hub 6 out of engagement with either of the surfaces 52 or 54 of the light reflective fabric 50.

Thus, it will be seen that a photographic light reflector device has been disclosed wherein one of two light reflective surfaces may be utilized and wherein the device is of light-weight construction and is easily collapsible and compactly contained for ease of transport and conversely because of ease of construction is erectible into utilization as a light reflective device or apparatus for use in photography.

In photography, one would merely fasten the elongate rod 12 to a tripod or other support so that the light reflective surface 52 (as seen in FIG. 1) would reflect the photographic lights. Alternately, if the light reflective surface 54 is desired, one would mount the member 50 in that relationship so that the surface 54 would be exterior and in the position of light reflective surface 52 as seen in FIG. 1. Additionally, the device 2 may be inverted so to speak, as it is shown in FIG. 1 and used by itself and the light played against the exterior, reflective surface of light reflective member 50 for purposes which those in the photography art will at once recognize.

While the invention has been described with regard to specific configuration and elements of construction, it is obvious that certain changes and modifications will suggest themselves to those of ordinary skill in the art and will not detract from the spirit and essence of the invention as defined by the appended claims.

I claim:

1. In a photographic light reflector device, the combination comprising: a selectively collapsible and erectible support structure including a first central hub member formed integrally with a first plurality of radially extending, spaced projections; an elongate rod member secured to the center of said first central hub; a second central hub member formed integrally with a second plurality of radially extending, spaced bifurcated projections equal in number to and aligned with said first plurality of radially spaced projections, said second central hub member being slidably disposed on said elongate rod member; means for fastening said second hub member to said rod member at selected points along the path of travel; a ray member of open channel configuration extending from and pivotally secured at one end to each of said first plurality of radially spaced projections, the opposite free ends of said ray members having notched configurations; a plurality of support members, each having one end pivotally secured between the bifurcations of each radially spaced projection of said second central hub member, with the opposed end of each being pivotally secured to an aligned ray member intermediate the ends thereof, each of said support members being of a size and shape to be received within the facing open channel of the aligned ray member to which each is pivotally secured; and a light reflective member of polygonal configuration having spaced apertures along the peripheral edge thereof corresponding in number to the number of rays in said plurality, said light reflective member being of sufficient size to be releasably retained by cooperation of said notched ends of said ray members being received by a respective spaced aperture, in taut secured relationship when said support structure is in the erected state, said aperture being of sufficient size to accommodate said notched ends but insufficient to allow the channel portions of said rays members to pass therethrough.

2. The photographic light reflector device in accordance with claim 1 which includes grommet members secured to the notched ends of said ray members in order to captively secure said light reflective member to said support structure.

3. The photographic light reflector device in accordance with claim 2 wherein said notched configuration of the free ends of said plurality of ray members has an upstanding abutment portion which acts to prohibit further movement of said light reflective member thereon and the spaced apertures of said light reflective member are provided with metal reinforcement rings.

4. The photographic light reflector device in accordance with claim 3 wherein the length of said elongate rod is sufficient to prevent displacement of said second hub from sliding disposition with respect thereto.

5. The photographic light reflector device in accordance with claim 4 wherein said grommets and are of elongate configuration having a central bore to be received on the notched ends of said ray members.

6. The photographic light reflector device in accordance with claim 5 wherein said support members are of such length to prevent flat or planar disposition of said light reflective member with regard to said support structure when in the erected state.

7. The photographic light reflector device in accordance with claim 6 wherein the said second hub is provided with a threaded aperture and a thumbscrew member is positioned therein for secured retention of said hub with regard to said elongate rod and said elongate rod carries a spaced stop to prevent overmovement of said second central hub member toward said first central hub member.

8. The photographic light reflector device in accordance with claim 7 wherein said light reflective member is of fabric, each surface thereof having a different light reflective surface and it is made up of triangular-like segments formed into a hexagonal shape and the peripheral edge thereof has a reinforced border.

* * * * *